(12) United States Patent
Perry et al.

(10) Patent No.: US 7,961,739 B2
(45) Date of Patent: Jun. 14, 2011

(54) SYSTEMS AND METHODS FOR VOICE OVER MULTIPROTOCOL LABEL SWITCHING

(75) Inventors: Sam Perry, Garland, TX (US); Richard Bianconi, Rowlett, TX (US); Yen Shei, Plano, TX (US)

(73) Assignee: Genband US LLC, Plano, TX (US)

( * ) Notice: Subject to any disclaimer, the term of this patent is extended or adjusted under 35 U.S.C. 154(b) by 980 days.

(21) Appl. No.: 11/317,278

(22) Filed: Dec. 23, 2005

(65) Prior Publication Data

US 2007/0019621 A1      Jan. 25, 2007

Related U.S. Application Data

(60) Provisional application No. 60/701,808, filed on Jul. 21, 2005.

(51) Int. Cl.
*H04L 12/56* (2006.01)
(52) U.S. Cl. ............ 370/397; 370/395.3; 370/469
(58) Field of Classification Search ............ 370/352, 370/389, 395.5, 466
See application file for complete search history.

(56) References Cited

U.S. PATENT DOCUMENTS

| | | | |
|---|---|---|---|
| 5,375,121 A | 12/1994 | Nishino et al. | |
| 5,905,873 A | 5/1999 | Hartmann et al. | |
| 5,999,529 A | 12/1999 | Bernstein et al. | |
| 6,046,999 A | 4/2000 | Miki et al. | |
| 6,147,988 A | 11/2000 | Bartholomew et al. | |
| 6,339,594 B1 | 1/2002 | Civanlar et al. | |
| 6,647,428 B1 | 11/2003 | Bannai et al. | |
| 6,731,627 B1 | 5/2004 | Gupta et al. | |
| 7,006,489 B2 | 2/2006 | Li et al. | |
| 7,023,846 B1* | 4/2006 | Andersson et al. | 370/389 |
| 2001/0007555 A1* | 7/2001 | Sasagawa et al. | 370/359 |
| 2001/0036158 A1 | 11/2001 | Hallenstal et al. | |
| 2002/0018471 A1* | 2/2002 | Shpak | 370/393 |
| 2002/0106029 A1* | 8/2002 | Bunn et al. | 375/257 |
| 2002/0169885 A1* | 11/2002 | Alao et al. | 709/230 |
| 2003/0123485 A1 | 7/2003 | Yi et al. | |

(Continued)

FOREIGN PATENT DOCUMENTS

CN            1504039 A        6/2004

(Continued)

OTHER PUBLICATIONS

International Search Report PCT/US2006/028549 dated Dec. 11, 2006.

(Continued)

*Primary Examiner* — Jayanti K Patel
*Assistant Examiner* — Bo Hui A Zhu
(74) *Attorney, Agent, or Firm* — Jenkins, Wilson, Taylor & Hunt, P.A.

(57) ABSTRACT

A method, system, and computer-readable medium for transmitting voice over multiprotocol label switching is provided. A packet that includes layer 3 and layer 4 headers is received. A label that identifies a label switched path in the packet is inserted, and a stream identifier is generated. The stream identifier is associated with at least a portion of content of the layer 3 and layer 4 headers. The layer 3 and layer 4 headers are removed from the packet, and the stream identifier is inserted into the packet. Additionally, methods, systems, and a computer-readable medium for processing a voice over multiprotocol label switching frame that excludes layer 3 and layer 4 headers are provided.

24 Claims, 4 Drawing Sheets

U.S. PATENT DOCUMENTS

2006/0092927 A1    5/2006    Li et al.

FOREIGN PATENT DOCUMENTS

| DE | 198 29 822 A | 1/2000 |
|---|---|---|
| GB | 2363295 | 12/2001 |
| WO | 99/29136 A1 | 6/1999 |
| WO | 02/069588 A2 | 9/2002 |
| WO | 02/069588 A3 | 9/2002 |

OTHER PUBLICATIONS

Laurence et al., "Voice Over ATM: A Hybrid TDM/ATM Design Approach," Electronic Engineering, Morgan-Grampian Ltd., vol. 71, No. 869, Jun. 1999, pp. 81-82, 84, 86.

Singer et al., "Narrowband Services Over ATM Networks: Evaluation of Trunking Methods," World Telecommunications Congress, vol. 2, Sep. 21, 1997, pp. 17-25.

EP Office Action 02709657.7, Dated Jan. 23, 2006.

International Search Report, PCT/US02/05410, dated Dec. 27, 2002.

Written Opinion, PCT/US02/05410, dated Jun. 13, 2003.

International Preliminary Examination Report, PCT/US02/05410, dated Dec. 5, 2003.

Communication pursuant to Article 94(3) EPC corresponding to European Patent Application No. 06788229.0-2413 (Jul. 21, 2008).

"Voice Services—MPLS Network Interworking," Series Y: Global Information Infrastructure, Internet Protocol Aspects and Next Generation Networks, ITU-T Y.1414 (Jul. 2004).

"Voice over MPLS—Bearer Transport Implementation Agreement," MPLS Forum 1.0, MPLS Forum Technical Committee (Jul. 27, 2001).

Casner et al. "Compressing IP/UDP/RTP headers for Low-Speed Serial Links," Network Working Group, RFC 2508 (Feb. 1999).

* cited by examiner

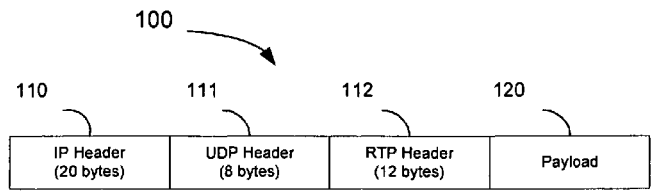
Figure 1
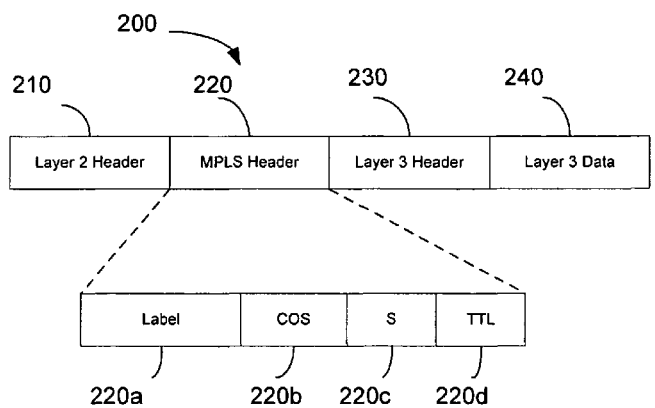
Figure 2A
Figure 2B

SYSTEMS AND METHODS FOR VOICE OVER MULTIPROTOCOL LABEL SWITCHING

RELATED APPLICATION DATA

This patent application claims the benefit of provisional U.S. Patent Application Ser. No. 60/701,808 filed Jul. 2005.

The present disclosure is also related to and incorporates herein U.S. patent application Ser. No. 11/121,626, "APPARATUS AND METHODS FOR PER-SESSION SWITCHING FOR MULTIPLE WIRELINE AND WIRELESS DATA TYPES," Inventor Sanqui Li, filed May 4, 2005, commonly assigned herewith.

BACKGROUND

The delivery of Voice over Internet Protocol (VoIP) is an emerging technology that offers several advantages over the traditional dedicated circuit-switched connections of the public switched telephone network (PSTN). Exemplary advantages that VoIP offers over PSTN include bandwidth consolidation and speech compression, both of which can contribute to overall network efficiency, among other advantages.

However, traditional VoIP solutions employ a "stacked header" approach, such as in the schematic representation of a VoIP frame 100 shown in FIG. 1. VoIP frame 100 includes an Internet protocol (IP) header 110, a user datagram protocol (UDP) header 111, a real time transport protocol (RTP) header 112, and a payload field 120 that carries voice data, such as adaptive multi-rate (AMR) voice data.

Consequently, when transmitting compressed speech, the accumulated size of the protocol headers 110-112 can result in high overhead and inefficient link usage. For example, assuming Adaptive Multi-Rate (AMR) at 7.95 kbps and 35% silence, the resulting VoIP stream bandwidth would be approximately 17.5 kbps, yielding a 3.7:1 reduction (compressed from a 64 kbps stream), while protocol headers would account for over 60% of the bandwidth. Similar examples can yield reduction far less than 4:1 compression, yet many applications require compression of 6:1, 8:1 or greater.

BRIEF DESCRIPTION OF THE DRAWINGS

Aspects of the present disclosure are best understood from the following detailed description when read with the accompanying figures, in which:

FIG. 1 is a diagrammatic representation of a traditional voice over IP packet that employs a stacked header approach;

FIG. 2A is a diagrammatic representation of a multiprotocol label switching labeled packet;

FIG. 2B is a diagrammatic representation of a layer 3 header;

DETAILED DESCRIPTION

Figure 3:
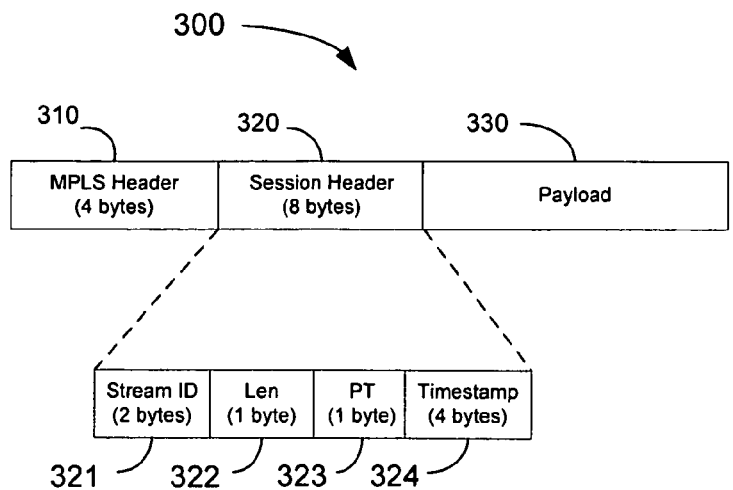
FIG. 3 is a diagrammatic representation of an embodiment of a session header that may be employed in lieu of the combined layer 3 and layer 4 headers.

It is to be understood that the present disclosure provides many different embodiments, or examples. Specific examples of components and arrangements are described to simplify the aspects of the present disclosure. Of course, these are merely examples, and are not necessarily intended to be limiting. In addition, the present disclosure may repeat reference numerals and/or letters in various figures and/or examples. This repetition is for the purpose of simplicity and clarity and does not in itself dictate a relationship between the various embodiments and/or configurations discussed.

RTP Header Compression

A feature of some embodiments of systems and/or methods according to aspects of the present disclosure is the incorporation of Real-Time Transport Protocol (RTP) header compression, such as that described in RFC2508: "Compressing IP/UDP/RTP Headers for Low-Speed Serial Links," incorporated herein by reference. In some embodiments, employing RTP header compression can reduce the combined IP, User Datagram Protocol (UDP), and RTP header to as small as two bytes, although other embodiments may exhibit less reduction. Systems and/or methods incorporating RTP header compression can include decompression and re-compression at several network components, or even at each network component, along the path of packet travel (e.g., at every "hop"). However, depending on the various aspects of myriad possible such applications, the frequency at which decompression and re-compression is performed along the path of data travel (e.g., the number of network components at which decompression and re-compression is performed) may be substantially decreased in some embodiments.

In embodiments in which such decompression and re-compression is required at one or more intermediary network components along the path of packet travel, such network components may include processing means configured to perform such decompression and re-compression, possibly including dedicated processing means employed exclusively for such processing. These and possibly other embodiments may also or alternatively include means for decreasing end-to-end delay which may be introduced by the additional processing.

Embodiments incorporating RTP header compression may also be implemented as a point-to-point application, possibly regardless of the number of intermediary network components at which decompression and re-compression is performed. One embodiment incorporating RTP header compression may also employ a link layer, such as point-to-point protocol (PPP).

RTP Multiplexing

A feature of some embodiments of systems and/or methods according to aspects of the present disclosure is the incorporation of RTP multiplexing, in which multiple RTP streams are carried in the same IP/UDP frame. Such embodiments may also incorporate the above-discussed RTP header compression, which may yield greater efficiency, among other possible results. Moreover, standardized solutions incorporating RTP multiplexing may be developed in the future. Additionally, or alternatively, one or more embodiments within the scope of the present disclosure may include means for decreasing complexity and/or delay at RTP stream endpoints.

Voice over MPLS (VoMPLS)

A feature of some embodiments of systems and/or methods according to aspects of the present disclosure is the incorporation of Voice over Multiprotocol Label Switching (VoMPLS), by which voice data is run on top of MPLS (e.g., directly on top of MPLS). MPLS is a standards-approved technology which can increase the speed of network traffic flow, which in turn can make traffic flow easier to manage. At least generally, MPLS may involve setting up a specific path for a given sequence of packets, datagrams and/or other data elements (herein collectively referred to as "packets," although merely for the sake of convenience and without intending any limitation to either packets, datagrams or other data elements). The path is identified by a label included in or otherwise associated with each packet, thus possibly saving the time needed for a router and/or other network component or function to look up the address of the next network component or node to which the packet is to be subsequently forwarded.

For example, a network node or other component (e.g., a media gateway) may be a label edge router (LER), or include an LER function, operable to add labels to packets to identify the path of packet travel. In some embodiments, packets are forwarded along a label switch path (LSP), along which one or more label switch routers (LSRs) may make forwarding decisions, possibly based solely on the contents of the label. At each LSR, media gateway, switch, node or other network component (e.g., each "hop"), the LSR may strip off the existing label and apply a new label indicating how the packet is to be forwarded at the next "hop."

MPLS may work with Internet Protocol (IP), Asynchronous Transport Mode (ATM), and/or frame relay network protocols, among others. With reference to the standard model for a telecommunications network (the Open Systems Interconnection, or OSI model), MPLS can allow packets (or some percentage of packet traffic) to be forwarded at the layer 2 (switching) level rather than at the layer 3 (routing) level. Additionally, or alternatively, MPLS may make it easier to manage performance, monitoring, and/or other aspects of a network, such as for quality of service (QoS) functions.

However, the scope of the present disclosure is not limited to MPLS as the protocol on which voice and/or other packetized data is transferred according to aspects of the present disclosure. For example, other OSI Layer 2 protocols may additionally or alternatively be employed to carry the voice or other packetized data. However, for the sake of simplicity, these OSI Layer 2 protocols may be collectively referred to herein as MPLS, although such convention does not necessarily limit any aspect of the present disclosure to exclusive applicability to MPLS.

FIG. 2A is a diagrammatic representation of an MPLS labeled packet 200. MPLS labeled packet 200 comprises a layer 2 header 210, an MPLS header 220, a layer 3 header 230, and layer 3 data 240. Layer 2 header may comprise, for example, an Ethernet header, a PPP header, an HLLC header, or the like. MPLS header 220 comprises a label field 220a, a class of service field 220b, a stack bit 220c, and a time to live field (TTL) 220d. Layer 3 header 230 may comprise, for example, an Internet Protocol (IP) header.

FIG. 2B is a diagrammatic representation of layer 3 header 230. In the illustrative example, layer 3 header 230 comprises an IP version 4 (IPv4) header. Layer 3 header 230 comprises a version field 230a, a header length field 230b, a type of service field 230c, and total length field 230d, an identification field 230e, a flags field 230f, a fragment offset filed 230g, a TTL field 230h, a protocol field 230i, a checksum field 230j, a source address field 230k, a destination address field 230l, an options field 230m, and a data field 230n.

Version field 230a may comprise a 4-bit field that specifies the IP version, for example IPv4 or IPv6. Embodiments of the present disclosure exploit the fact that IP headers, whether version 4 or version 6, include a leading zero as the first bit of version field 230a.

Embodiments which incorporate VoMPLS according to aspects of the present disclosure may eliminate the IP/UDP/RTP headers. For example, an eight-byte session header may be employed in lieu of the combined IP/UDP/RTP (layer 3 and layer 4) headers, such as in the example set forth below in FIG. 3 which shows a schematic depiction of an embodiment of a VoMPLS frame 300. In the illustrative example, VoMPLS frame 300 includes an MPLS header 310, a session header 320, and a payload field 330. Session header 320 may also be referred to as a stream header. Also, reference herein to an IP/UDP/RTP headers may be applicable and/or readily adaptable to IP/UDP headers, IP/TCP headers, or other session-based protocol headers, which for the sake of simplicity may hereafter be referred to simply as an IP/UDP/RTP header without necessarily intending to imply limitation to IP/UDP/RTP headers only. Notably, frame 300 does not include a layer 3 (network) or layer 4 (transport) header and thus provides an improved over-head benefit for transmission purposes.

Of course, the scope of the present disclosure is not limited to the embodiment depicted in FIG. 3. For example, session header 320 may include fewer or greater than eight bytes. Moreover, data other than that depicted in session header 320 shown in FIG. 3 may additionally or alternatively be included in session header 320. The sequence of MPLS header 310, session header 320 and payload field 330 may also vary from the embodiment illustrated in FIG. 3. For example, in embodiments in which data corresponding to multiple sessions may exist in common packets, session header 320 may differ from the example depicted in FIG. 3, or multiple session headers may be employed within individual packets.

In the embodiment shown in FIG. 3, session header 320 includes a stream ID field 321, a length field 322, a payload type (PT) field 323, and a timestamp field 324. A "Stream Id" variable of stream ID field 321 is an end-to-end identifier, which represents a VoIP or other Voice of Packet (VoP) call, session or stream in one direction. In the present example, the stream ID variable is two bytes in length. In one embodiment, the Stream Id may be passed to other media gateways, nodes or other network components via Session Description Protocol (SDP) exchange, such as via Megaco/H.248 or an SGCP or MGCP message, or included therein, possibly amongst other data. The Stream Id may also be passed in messages including additional data. Additionally, in accordance with an embodiment, stream ID field 321 may be configured to indicate the absence of layer 3 and layer 4 data in frame 300 such that a device implemented in accordance with embodiments disclosed herein may properly process frame 300.

In the embodiment shown in FIG. 3, a "Len" variable of Length field 322 indicates the length of the VoMPLS frame payload of payload field 330, such as a length defined by number of bytes. For example, Len may comprise eight bits, thus indicating a payload size of up to 255 bytes.

In the embodiment shown in FIG. 3, the "PT" variable of PT field 323 identifies the type of payload or the codec corresponding to the payload data. For example, the PT variable may be copied from an RTP header received from a sender. Examples of PT variables include, without limitation, information indicative of a codec employed for a particular session, channel, tunnel, etc., such as an AMR codec, an AMR Wideband (AMR-WB) codec, an enhanced AMR-WB (AMR-WB+) codec, G.711, G.729, G.723.1, G.726, G.728, JPEG/MPEG variants (e.g., MP3), free lossless audio codec (FLAC), true audio (TTA), Windows Media Audio (WMA), RealAudio, and Speex or other codecs based on Code Excited Linear Prediction (CELP), among others. Other PT variables may indicate the type of data in the payload by characteristic(s) other than a corresponding codec, such as whether the payload comprises audio or video data, or whether the data is AMR, variable bit rate (VBR), constant bit rate (CBR), or another bit rate. The PT variable (and/or another variable/field in the header) may also or alternatively indicate the session technology of the originating and/or destination terminal, such as UMTS, GSM, CDMA, TDM, voice of digital subscriber line (VoDSL), or WiMAX/WiFi, among others.

A "Timestamp" variable of timestamp field 324 may also be copied from an RTP header received from a sender. The Timestamp variable may be employed to facilitate re-assembly of packets upon their receipt at their ultimate destination. Alternatively, or additionally, a sequence number, indicator or field may be employed at the packet or session destination during the re-assembly of packets. However, means other than timestamping and sequential numbering may also or alternatively be employing to reassemble packets upon their arrival at their destination. Thus, Timestamp field 324 depicted in FIG. 3 may be considered a "re-sequencing" field that includes one or more data, indicators, identifiers, etc., that may be employed for such re-assembly or re-sequencing of frames.

As discussed above, VoMPLS frame 300 does not include a layer 3 or layer 4 header. Aspects of some embodiments incorporating the session header fields as described above may allow the recovery of the original IP/UDP/RTP headers, possibly including to such extent as to allow for the processing and/or extraction of the original VoIP data at a destination node or a network edge node. A switch, gateway, router, or other device implemented in accordance with embodiments described herein may recognize frame 300 as excluding layer 3 and layer 4 header data by, for example, identification of a pre-defined bit or bit pattern within frame 300. In accordance with one embodiment, stream ID field 321 may be configured to include a leading bit set to a value of "1" to distinguish frame 300 from a conventional MPLS packet. In this manner, a switch, gateway, or other network device configured in accordance with embodiments disclosed herein may recognize frame 300 as a VoMPLS frame that excludes layer 3 and layer 4 data. For example, an egress node that terminates a MPLS path may identify frame 300 as a VoMPLS frame that excludes layer 3 and layer 4 header data and may recover original IP/UDP/RTP headers, or portions thereof, and reconstruct the frame accordingly. In other embodiments, a device configured in accordance with embodiments disclosed herein may reconstruct the original IP/UDP/RTP data in part and may configure unreconstructed portions of IP/UDP/RTP data with default data. For example, a switch, gateway, or other device disposed at a terminating end of an MPLS path may recognize frame 300 as excluding IP/UDP/RTP headers and may interrogate a stream translation table for original layer 3 and/or layer 4 header data. MPLS header 310 may then be stripped from frame 300, original layer 3 and layer 4 headers may be reconstructed and inserted into frame 300, and the reconstructed frame may then be transmitted from the device to be routed to the destination.

Figure 4:
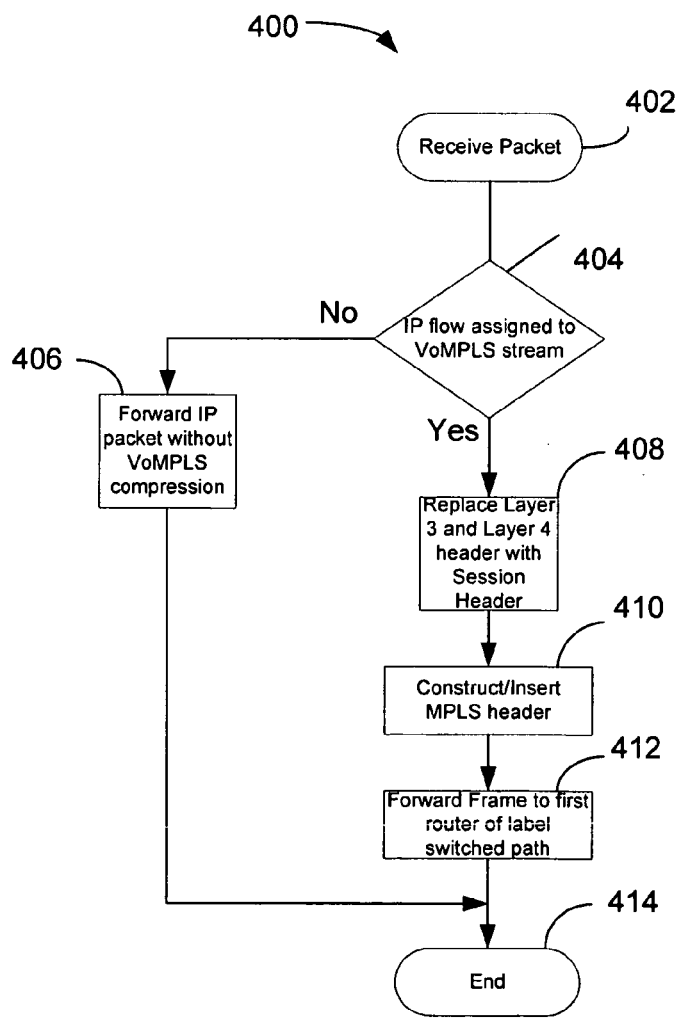
FIG. 4 is a flowchart depicting an embodiment of a voice over multiprotocol label switching labeled frame construction routine.

FIG. 4 is a flowchart 400 depicting an embodiment of a VoMPLS frame construction routine. A device, such as a network device disposed at an originating or ingress end of a MPLS path, receives a packet from a network entity (step 402). An evaluation is then made to determine if a label has been assigned to the IP flow (step 404). In the event a label has not been assigned to the IP flow, the packet is forwarded on the network without VoMPLS compression (step 406), and the VoMPLS frame construction routine cycle may then end (step 414). If it is determined at step 404 that a label has been assigned to the IP flow, the frame construction routine may proceed to generate a session header (including a stream identifier) and replace the layer 3 and layer 4 headers with the generated session header (step 408). An MPLS header may be constructed and inserted into the frame (step 410). The resulting frame may then be forwarded to the first router of the label switched path (step 412). The VoMPLS frame construction routine cycle may then end (step 414).

Figures 5, 6:
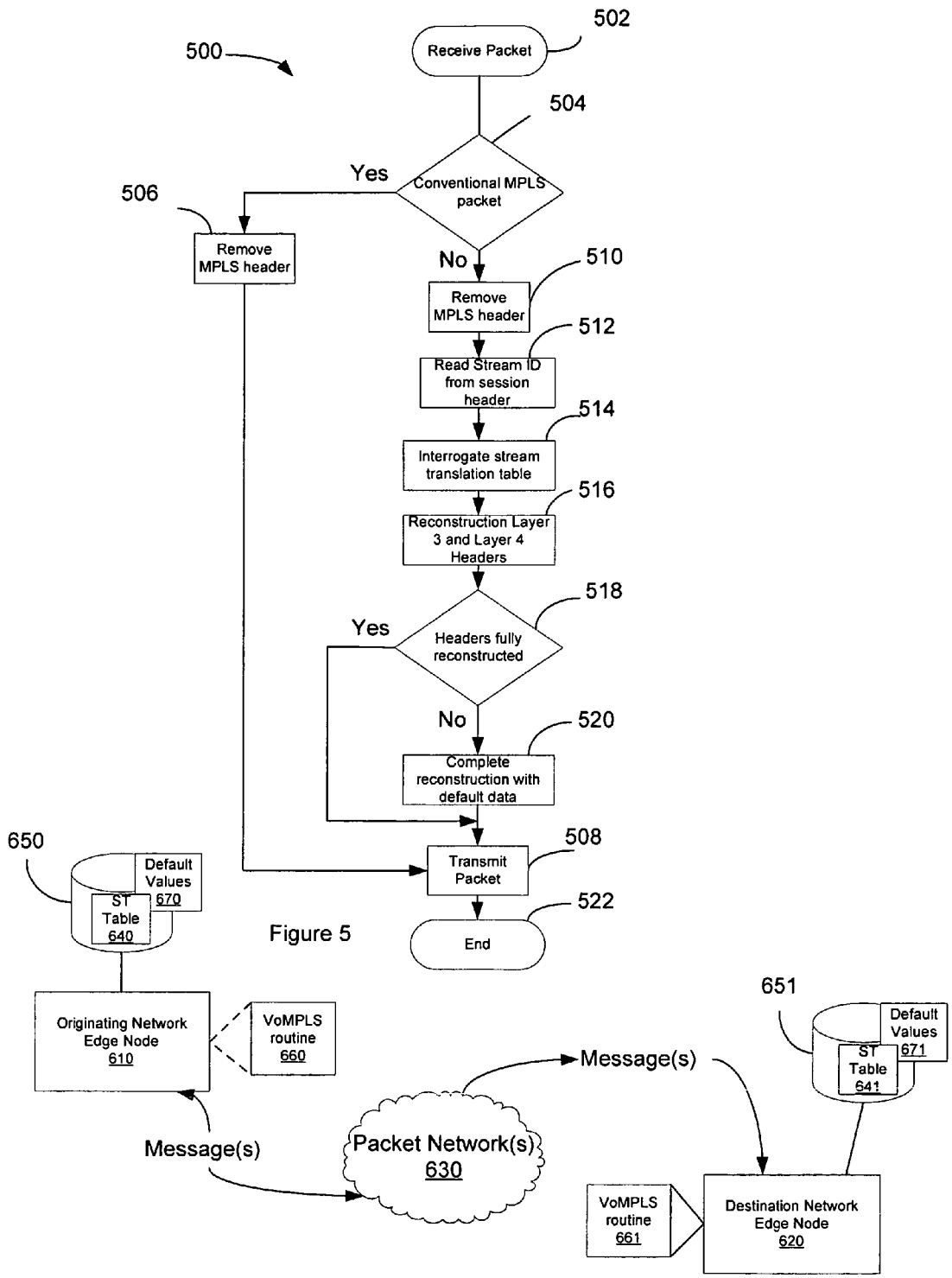
FIG. 5 is a flowchart depicting an embodiment of a voice over multiprotocol label switching frame processing routine.
FIG. 6 is a schematic diagram illustrating further aspects of a stream identifier implemented in a voice over multiprotocol label switching labeled frame.

FIG. 5 is a flowchart 500 depicting an embodiment of VoMPLS frame processing routine. A device, such as a network device disposed at a terminating or egress end of a MPLS path, receives a frame (step 502) and evaluates the frame to determine if it is a conventional MPLS labeled packet or if it is an MPLS frame that excludes layer 3 and layer 4 headers (step 504). For example, a first bit following the MPLS header of the received frame may be evaluated to determine if it is set to a value of "0." In the event that the packet is evaluated as a conventional MPLS labeled packet, the device may then remove the MPLS header (step 506) and forward the packet on the network (step 508). The device processing cycle may then end (step 522).

Returning again to step 504, in the event that the frame is evaluated as a MPLS frame that excludes layer 3 and layer 4 headers (e.g., the first bit following the MPLS header is evaluated as "1"), the MPLS header may be removed (step 510), and a stream ID may be read from the session header (step 512). A stream translation table that maintains stream identifiers in association with layer 3 and layer 4 data may then be interrogated with the stream ID (step 514). The layer 3 and/or layer 4 header(s) may then be reconstructed (step 516). An evaluation may be made to determine if the layer 3 and layer 4 headers are fully reconstructed (step 518). In the event that the layer 3 and layer 4 headers have been fully reconstructed, the reconstructed packet may then be transmitted on the network according to step 508. In the event that the packet is evaluated as not having been fully reconstructed at step 518, the reconstruction of the frame may be completed by using default data for the portion(s) of the packet that are identified as not reconstructed (step 520). The packet may then be forwarded on the network according to step 508, and the processing routine cycle may then end according to step 522.

An exemplary VoMPLS bandwidth calculation will now be described. However, the scope of the present disclosure is not limited to the values/parameters employed in the following example.

In an embodiment employing AMR at 7.95 kbps, where the payload is 24 bytes, the AMR-encoded bearer data is 20 bytes, the IuUP header is 4 bytes, the Silence Insertion Description (SID) frames are 10 bytes (including IuUP header), and the VoMPLS headers total 12 bytes, an assumption of 35% Voice Activation Detection (VAD) yields:

$$(36*0.65)+[(22/(160/20))*0.35]=24.4 \qquad (1)$$

$$24.4*50*8=9.76 \text{ kbps} \qquad (2)$$

or $$6.5:1 \text{ compression ratio.} \qquad (3)$$

Again, the above example is for demonstrative purposes only, and is not limiting to scope of the present disclosure. For example, one embodiment within the scope of the present application may yield a compression ratio of about 5:1 (or greater than about 5:1). Other embodiments implementing aspects of the present disclosure may yield a compression ratio ranging between about 6:1 and about 8:1. One such embodiment yields a compression ratio of about 7:1. Other embodiments according to aspects of the present disclosure may yield a compression ratio greater than about 8:1. For example, compression ratios of such embodiments may be about 8.5:1 (or greater than about 8.5:1), about 9:1 (or greater than about 9:1), about 9.5:1 (or greater than about 9.5:1), or about 10:1 (or greater than about 10:1). Other embodiments according to aspects of the present disclosure may yield other compression ratios. In one embodiment, implementing VoMPLS according to aspects of the present disclosure may allow up to about 65,535 RTP streams per MPLS tunnel, although other embodiments within the scope of the present disclosure may allow fewer or greater RTP streams per MPLS tunnel.

Some embodiments which incorporate VoMPLS according to aspects of the present disclosure may be or resemble non-standardized solutions (e.g., with respect to MPLS or VoMPLS standards). Nonetheless, such embodiments may follow, substantially conform, or at least partially conform to at least some principles of related industrial standards. For example, one or more aspects of such embodiments may at least partially correspond to aspects of the "Voice over MPLS—Bearer Transport Implementation Agreement," developed by MPLS Forum Technical Committee in 2001, and/or the ITU-T Y.1414 Standard "Voice Services—MPLS Network Interworking" (both of which are incorporated herein by reference).

End-to-End Session Identifier

FIG. 6, set forth below, is a schematic diagram illustrating further aspects of the Stream ID introduced above.

One aspect introduced in the present disclosure is the labeling or otherwise identification means of each packet associated with a particular telecommunications session (e.g., a telephone call). As shown in FIG. 6, one or more messages may be sent between an originating network edge node (610) and a destination network edge node (620) via one or more packet networks (630) (and/or other networks). These messages may be SDP messages as described above, such as Megaco/H.248, SGCP and/or MGCP messages, among others, including those which may have standardized formats that include lines, fields, tokens or other place holders which may or may not be necessarily employed in each message transferred between the edge nodes. The messages may transmit various types of information between the network nodes, possibly including during session initiation or similar processes, where such information may include IP addresses (e.g., source and destination IP addresses), UDP port, and/or other information descriptive of the particular edge node sending the message. Consequently, this information may be employed with (and possibly to generate) a session identifier, such as the Stream ID introduced above although the stream ID may be generated by other mechanisms. Consequently, the session identifier may be appended or otherwise included in each packet transferred during the session. In some embodiments, this can be advantageous because it may allow for straightforward look-up at the destination network edge node to recover the original IP/UDP/RTP headers. In fact, in one embodiment according to aspects of the present disclosure, the proprietary header may include only this Stream ID or similar session identifier.

A generated stream ID may be maintained in a stream translation (ST) table maintained, or accessible by, originating network edge node 610 and/or destination network edge node 620. In the illustrative example, each of edge nodes 610 and 620 maintain respective stream translation tables 640 and 641 in storage devices 650 and 651. Each of edge nodes 610 and 620 are preferably configured with an instance of a VoMPLS processing routine 660 and 661 as computer executable instructions tangibly implemented on a computer-readable medium. VoMPLS processing routine 660 and 661 preferably includes logic for generating VoMPLS frames as described above with reference to FIG. 4 and for receiving and processing VoMPLS frames for the reconstruction of the original packets (or portions thereof) as described above with reference to FIG. 5.

Additionally, each instance of VoMPLS routine 660 and 661 may maintain or access a data source of default layer 3 and/or layer 4 header values that may facilitate reconstruction of packets at an egress node of a label switched path. For example, VoMPLS routine 660 may access default values 670 maintained in storage device 650 that identify suitable default values that may be used in the reconstruction of a packet prior to placing the packet on the network. In a similar manner, VoMPLS routine 661 may access default values 671 for reconstruction of packets. Default values 670 and 671 may be used for header values that are not reconstructed from tables 640 and 641. In some scenarios, the complete layer 3 and layer 4 headers may be reconstructed solely from the stream identifier and associated data maintained in stream translation tables 640 and 641. However, in the event that the layer 3 and layer 4 headers are not completely reconstructed from the stream translation table, default values may facilitate the assembly of a complete layer 3 and/or layer 4 header. Default values 670 and 671 may specify one of more layer 3 or layer 4 header values that may be inserted into a packet being reconstructed that do not effect routing of the packet and that may differ from the original header value of the packet. For example, default values 670 and 671 may include layer 3 or layer 4 header default values, such as a default value of "4" for version field 230a of a reconstructed layer 3 header conforming to layer 3 header 230 shown in FIG. 2, a type of service value for insertion into a type of service field 230c, default flag values for insertion into flags field 230f, a time to Live default value (e.g., "255") for insertion into time to live field 230h, a default protocol value (e.g., "UDP"), for insertion into protocol field 230i, or other suitable default layer 3 and/or layer 4 header values. By providing default values that may be included in layer 3 or layer 4 header fields that are non-recovered from the original header values, the reconstructed packet will conform with the proper protocol and header format without impacting network treatment of the reconstructed packet.

FIG. 6 may also represent two or more media gateways or other network edge components connected via one or more MPLS or MPLS-enabled networks. The one or more MPLS or MPLS-enabled networks may comprise one or more LERs, one or more LSPs, and/or one or more LSRs.

Figure 7:
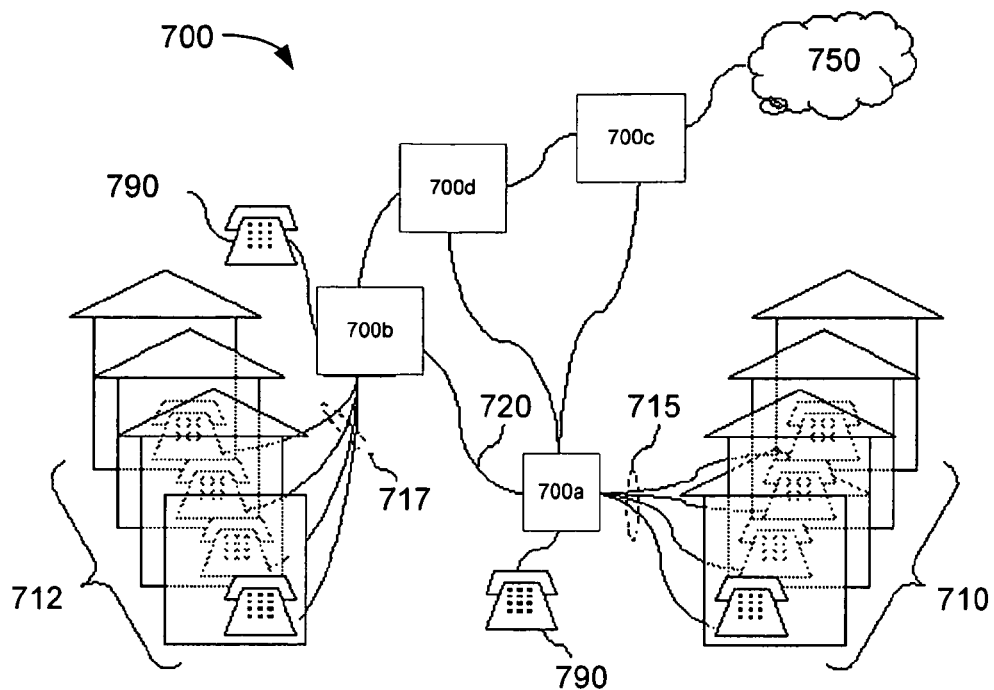
FIG. 7 is a schematic diagram of an embodiment of at least a portion of a network in which embodiments disclosed herein may be implemented.

FIG. 7 is a schematic diagram of an embodiment of at least a portion of a network 700 in which embodiments disclosed herein may be implemented.

Network 700, which may include several networks and/or portions of networks, as well as the apparatus, systems, and/or methods of network 700, or aspects thereof, demonstrates possible implementations of one or more aspects of the above-described RTP header compression, RTP multiplexing, and/or VoMPLS according to aspects of the present disclosure. For example, network 700 includes apparatus 700a-

700d, where aspects of each of the apparatus 700a-700d may implement one or more aspects of the above-described RTP header compression, RTP multiplexing, and/or VoMPLS.

However, some embodiments of network 700 may not include each of the apparatus 700a-700d or other network components depicted in FIG. 7, and aspects of the above-described RTP header compression, RTP multiplexing, and/or VoMPLS may not be implemented in each of the apparatus 700a-700d. One or more of the apparatus 700a-700d may be or include a media gateway or other switching device as described in U.S. patent application Ser. No. 11/121,626, entitled "APPARATUS AND METHODS FOR PER-SESSION SWITCHING FOR MULTIPLE WIRELINE AND WIRELESS DATA TYPES," Inventor San-qi Li, commonly assigned herewith (incorporated in its entirety herein).

Apparatus 700a is connected by a plurality of loops 715 to one or more PSTN access networks 310 that may include a plurality of residential telephones and/or business exchanges (PBX). In one embodiment, the telephones may be grouped by digital loop carriers, PBXs, and/or other aggregators which may be included in one or more PSTN access networks 710, or may otherwise be configured to communicate with apparatus 700a through PSTN access network 710. Loops 715 may include digital loops and/or analog loops, and may be configured to transmit TDM and other PSTN data, among others. Thus, apparatus 700a may be a central office switch, or a Class 5 switch, or employed/operable as such a switch. Accordingly, any PSTN access network 710 connected to apparatus 700a may communicate with another PSTN access network 710 connected to apparatus 700a.

Apparatus 700a is also connected to apparatus 700b by a trunk or other transmission line 720. Apparatus 700b is, in turn, connected to a plurality of residential telephones, business PBXs, digital loop carriers, and/or PSTN access networks 712 (hereafter collectively referred to as PSTN access networks 312, although merely for the sake of simplicity) by a corresponding plurality of loops 717, which may each be substantially similar to one or more of loops 715. Thus, any of the PSTN access networks 710 may communicate with any of the PSTN access networks 712 via apparatus 700a and 700b, trunk 720, and corresponding ones of loops 715 and 717. As also shown in FIG. 7, a telephone or other personal telecommunications device 790 may also be directly connected to apparatus 700a.

Apparatus 700c and/or 700d may each be deployed as a media gateway to interconnect a PSTN or other type of network 750. Apparatus 700c and/or 700d may each also or alternatively be deployed as a tandem media gateway or Class 4 switch to interconnect a local access PSTN network (e.g., network 710) to tandem network 750 (e.g., via apparatus 700a).

As also shown in FIG. 7, one or more telephones or other personal telecommunications devices 790 may also be directly connected to one or more of the apparatus 700a and 700b (among others). Consequently, the telecommunications devices 790 may be connected via one or more of the apparatus 700a-700d and a connecting trunk but without the loops 715 and 717. Moreover, the signaling between telecommunications devices 790 connected in such a manner, and otherwise for other connections between two or more of the apparatus 700a-700d, may be via a CAS signaling system, possibly an R2 signaling system, or a CCS signaling system, among others.

Figure 8:
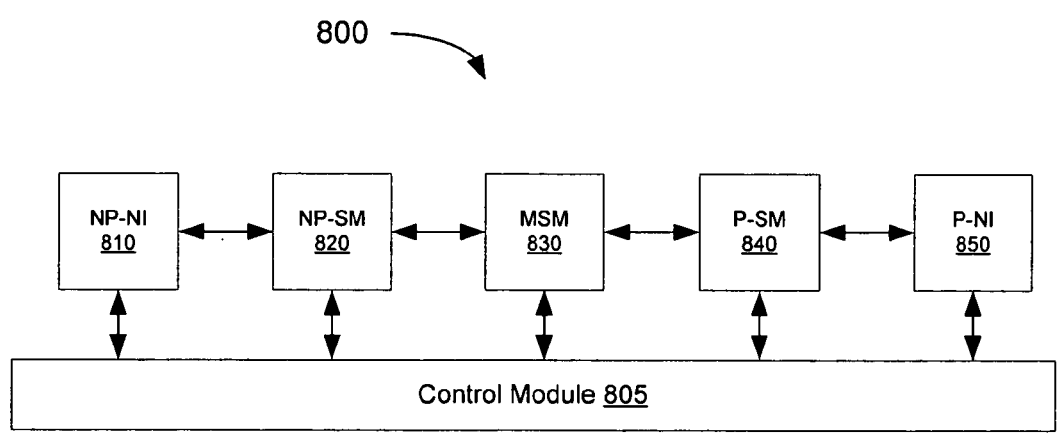
FIG. 8 is a schematic depiction of an exemplary media gateway in which embodiments disclosed herein may be implemented.

FIG. 8 is a schematic depiction of an exemplary media gateway (MG) 800 which may be substantially similar to one or more of the apparatus 700a-700d discussed above with reference to FIG. 7.

MG 800 may also be substantially similar to one or more of those described in U.S. patent application Ser. No. 11/121,626, entitled "APPARATUS AND METHODS FOR PER-SESSION SWITCHING FOR MULTIPLE WIRELINE AND WIRELESS DATA TYPES," Inventor San-qi Li. In the illustrative example, MG 800 includes a non-packet network interfaces (NP-NI) 810, a non-packet switching matrix (NP-SW) 820, a multi-service module (MSM) 830, a packet switching matrix (P-SM) 840, and a packet network interface 850 each in communication with a control module 805 configured to control one or more of NP-NI 810, NP-SM 820, MSM 830, P-SM 840, and P-NI 150, such as for the purpose of per-session based switching. The control module 805 may comprise two or more control modules, possibly configured as primary and redundant control modules. Packet network interface (P-NI) 850 may include processing means for converting IP/UDP/RTP headers into compressed headers, removing layer 3 and layer 4 headers (e.g., IP/UDP/RTP headers), and generating a session header therefrom having one or more aspects similar to those described above (e.g., session header 220 shown in FIG. 2) prior to sending packets to the packet-network. Additionally, the packet network interface may be adapted to generate a session translation table that associates a stream ID with layer 3 and/or layer 4 information, write to the stream translation table, and interrogate and read content of the session translation table for reconstruction of layer 3 and layer 4 headers (or a portion thereof). Such processing means may further be configured to convert such proprietary headers into IP/UDP/RTP headers, or other types of headers, where necessary, prior to sending packetized data received from the packet-network further through the MG 800.

The foregoing and the Appendices outline features of several embodiments so that those skilled in the art may better understand the aspects of the present disclosure. Additional features and aspects of these and/or other embodiments within the scope of the present disclosure may be further described in the Appendices listed above. Those skilled in the art should appreciate that they may readily use the present disclosure (including the Appendices) as a basis for designing or modifying other methods, processes, structures, devices, apparatus, and/or systems for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method of transmitting media data in a network, comprising:
   receiving a packet that includes layer 3 and layer 4 headers;
   generating a session header including a length field that specifies a payload length of the packet, a protocol field that specifies a protocol of payload data of the packet, a timestamp field that includes sequencing data of the packet in the session header, and a stream identifier, wherein the stream identifier is an end-to-end identifier of a voice over packet (VoP) session in one direction, wherein the stream identifier is a value that remains constant for packets belonging to the same VoP session;
   associating the stream identifier with at least a portion of content of the layer 3 and layer 4 headers such that the stream identifier is usable to access stored data for reconstructing the at least a portion of the content of the layer 3 and layer 4 headers;

removing the layer 3 and layer 4 headers from the packet; and inserting the stream identifier in the packet.

2. The method of claim 1, wherein the media comprises audio data.

3. The method of claim 1, further comprising inserting a label in the packet that identifies a label switched path.

4. The method of claim 3, wherein inserting the label further comprises inserting a multiprotocol label switching label.

5. The method of claim 1, wherein the packet is transmitted in the network by way of a packet switching protocol.

6. The method of claim 1, wherein the packet is transmitted in the network by way of a circuit switching protocol.

7. A method of producing a packet from a frame, comprising:

receiving a frame that excludes layer 3 and layer 4 headers;

reading a stream identifier from a session header of the frame, the session header including a length field that specifies a payload length of the packet, a protocol field that specifies a protocol of payload data of the packet, a timestamp field that includes sequencing data of the packet in the session header, and wherein the stream identifier is an end-to-end identifier of a voice over packet (VoP) session in one direction, wherein the stream identifier is a value that remains constant for packets belonging to the same VoP session;

obtaining layer 3 and layer 4 data associated with the stream identifier by using the stream identifier to access stored data for reconstructing at least a portion of the layer 3 and layer 4 headers;

generating the layer 3 and layer 4 headers from the layer 3 and layer 4 data; and inserting the generated layer 3 and layer 4 headers into the frame.

8. The method of claim 7, wherein receiving a frame further comprises receiving a frame that includes a label that specifies a label switched path, the method further comprising removing the label.

9. The method of claim 8, wherein receiving a frame that includes a label further comprises receiving a frame that includes a multiprotocol label switching label.

10. The method of claim 7, wherein obtaining layer 3 and layer 4 data further comprises interrogating a table that stores a plurality of stream identifiers respectively in association with layer 3 and layer 4 data.

11. The method of claim 7, wherein obtaining layer 3 and layer 4 data further comprises obtaining a portion of original layer 3 and layer 4 data of the frame, the method further comprising:

obtaining at least one default value of at least one field of the layer 3 header or the layer 4 header; and including the at least one default value in the generated layer 3 and layer 4 headers.

12. A computer-readable medium having computer-executable instructions for execution by a processing system, the computer-executable instructions for transmitting media data in a network, comprising:

instructions that receive a packet that includes layer 3 and layer 4 headers;

instructions that generate a stream identifier comprising instructions that generate a session header including the steam identifier, a length field that specifies a payload length of the packet, a protocol field that specifies a protocol of the payload data, and a timestamp field that includes sequencing data of the packet in the session header, wherein the stream identifier is an end-to-end identifier of a voice over packet (VoP) session in one direction, wherein the stream identifier is a value that remains constant for packets belonging to the same VoP session;

instructions that associate the stream identifier with at least a portion of content of the layer 3 and layer 4 headers such that the stream identifier is usable to access stored data for reconstructing the at least a portion of the content of the layer 3 and layer 4 headers;

instructions that remove the layer 3 and layer 4 headers from the packet; and instructions that insert the stream identifier in the packet.

13. The computer-readable medium of claim 12, further comprising instructions that insert a label that identifies a label switched path in the packet.

14. A non-transitory computer-readable medium having computer-executable instructions for execution by a processing system, the computer-executable instructions for producing a packet from a frame, comprising:

instructions that receive a frame that excludes layer 3 and layer 4 headers;

instructions that read a stream identifier from a session header of the frame, the session header including a length field that specifies a payload length of the packet, a protocol field that specifies a protocol of payload data of the packet, a timestamp field that includes sequencing data of the packet in the session header, and wherein the stream identifier is an end-to-end identifier of a voice over packet (VoP) session in one direction, wherein the stream identifier is a value that remains constant for packets belonging to the same VoP session;

instructions that obtain layer 3 and layer 4 data associated with the stream identifier by using the stream identifier to access stored data for reconstructing at least a portion of the content of the layer 3 and layer 4 headers;

instructions that generate the layer 3 and layer 4 headers from the layer 3 and layer 4 data; and instructions that insert the generated layer 3 and layer 4 headers into the frame.

15. The computer-readable medium of claim 14, wherein the frame includes a label that specifies a label switched path, the computer-readable medium further comprising instructions that remove the label.

16. The computer-readable medium of claim 14, wherein the instructions that obtain the layer 3 and layer 4 data interrogate a table that stores a plurality of stream identifiers respectively in association with layer 3 and layer 4 data.

17. The computer-readable medium of claim 14, wherein the instructions that obtain layer 3 and layer 4 data obtain a portion of original layer 3 and layer 4 data of the frame, the computer readable medium further comprising:

instructions that obtain at least one default value of at least one field of the layer 3 header or the layer 4 header; and instructions that include the at least one default value in the generated layer 3 and layer 4 headers.

18. A network apparatus for delivering data packets in a network, comprising:

a network interface adapted to couple with a network medium; and a processor adapted to process executable instructions that, in response to receipt of a packet that includes layer 3 and layer 4 headers, generates a session header including a length field that specifies a payload length of the packet, a protocol field that specifies a protocol of payload data of the packet, a timestamp field that includes sequencing data of the packet in the session header, and a stream identifier, wherein the stream identifier is an end-to-end identifier of a voice over packet (VoP) session in one direction, wherein the stream identifier is a value that remains constant for packets belonging to the same VoP session, associates the stream identifier with at least a portion of content of the layer 3 and layer 4 headers such that the stream identifier is usable to access stored data for reconstructing the at least a portion of the content of the layer 3 and layer 4 headers, removes the layer 3 and layer 4 headers from the packet, and inserts the stream identifier in the packet.

19. The apparatus of claim 18, wherein the processor inserts a label in the packet that identifies a label switched path.

20. The apparatus of claim 18, wherein the network interface comprise one of a non-packet network interface and a packet network interface.

21. A network apparatus for delivering data packets in a network, comprising:
a network interface adapted to couple with a network medium; and
a processor adapted to process executable instructions, wherein the apparatus receives a frame that excludes layer 3 and layer 4 headers, and the processor, response to execution of the executable instructions, reads a stream identifier from a session header of the frame, the session header including a length field that specifies a payload length of the packet, a protocol field that specifies a protocol of payload data of the packet, a timestamp field that includes sequencing data of the packet in the session header, and wherein the stream identifier is an end-to-end identifier of a voice over packet (VoP) session in one direction, wherein the stream identifier is a value that remains constant for packets belonging to the same VoP session, obtains layer 3 and layer 4 data associated with the stream identifier by using the stream identifier to access stored data for reconstructing at least a portion of the content of the layer 3 and layer 4 headers, generates the layer 3 and layer 4 headers from the layer 3 and layer 4 data, and inserts the generated layer 3 and layer 4 headers into the frame.

22. The apparatus of claim 21, wherein the received frame includes a label that specifies a label switched path, and the processor removes the label.

23. The apparatus of claim 21, wherein the processor obtains layer 3 and layer 4 data by interrogating a table that stores a plurality of stream identifiers respectively in association with layer 3 and layer 4 data.

24. The apparatus of claim 21, wherein the layer 3 and layer 4 data obtained comprises a portion of original layer 3 and layer 4 data of the received frame, wherein the apparatus obtains at least one default value of at least one field of the layer 3 header and the layer 4 header and includes the at least one default value in the generated layer 3 and layer 4 header.

* * * * *